United States Patent [19]

Niizawa et al.

[11] Patent Number: 5,326,333
[45] Date of Patent: Jul. 5, 1994

[54] DIFFERENTIAL APPARATUS WITH CARRIER AXIALLY MOVABLE RELATIVE TO AN OUTPUT HUB

[75] Inventors: Yoshikazu Niizawa; Isao Hirota, both of Tochigi, Japan

[73] Assignee: Tochigi Fuji Sangyo Kabushiki Kaisha, Tochigi, Japan

[21] Appl. No.: 978,361

[22] Filed: Nov. 18, 1992

[30] Foreign Application Priority Data

Nov. 19, 1991 [JP] Japan ............... 3-303188

[51] Int. Cl.⁵ ............... F16H 1/44; F16D 27/115
[52] U.S. Cl. ............... 475/249; 475/150
[58] Field of Search ............... 475/248, 249, 250, 252, 475/253, 150

[56] References Cited

U.S. PATENT DOCUMENTS 4,781,078 11/1988 Blessing et al. ............... 475/150
5,102,378 4/1992 Gobert ............... 475/249 X
5,156,578 10/1992 Hirota ............... 475/150

FOREIGN PATENT DOCUMENTS 3-68634 7/1991 Japan .
404064747 2/1992 Japan ............... 475/150

Primary Examiner—Leslie A. Braun
Assistant Examiner—Khoi Ta
Attorney, Agent, or Firm—Graham & James

[57] ABSTRACT

A differential apparatus is disclosed for controlling differential between left- and right-hand axles of a vehicle. A differential mechanism of planetary gear type is received within a differential case. The differential case is provided with a ring gear of the differential mechanism. A first hub is provided with a sun gear of the differential mechanism, and is fixed to one of the axles. A second hub is so provided as to be capable of being rotatable with respect to the first hub, and is fixed to the other axle. The carrier is movable axially relative to the second hub of the differential mechanism and is integrally rotatable together with the second hub of the differential mechanism. A first friction clutch for limiting differential between the carrier and the first hub is engaged by a cam mechanism controlled by a second friction clutch.

6 Claims, 3 Drawing Sheets

DIFFERENTIAL APPARATUS WITH CARRIER AXIALLY MOVABLE RELATIVE TO AN OUTPUT HUB

BACKGROUND OF THE INVENTION

The present invention relates to a differential apparatus for controlling differential between both left- and right-hand axles of a car or vehicle.

Japanese Utility Model Laid-Open No. HEI 3-68634 discloses a differential apparatus which is provided with a differential limiting mechanism. The differential limiting mechanism is arranged such that a main clutch is engaged by a thrust force of a cam which receives a differential torque through a pilot clutch, to limit differential rotation of a differential mechanism. The differential mechanism is of the planetary gear type in which a pinion carrier is formed integrally with a hub connected to an axle through spline, and serves as an urging element of the main clutch due to cam thrust force.

Methods of canceling out a centrifugal force of a vehicle body when the vehicle is turned and a thrust force generated on the axle due to the centrifugal force with each other include a method of executing the cancellation between the axle and the vehicle body and, in addition thereto, a method of axially positioning the axle and the hub, and the hub and a differential case in case of the above-described prior art, for example, to execute the cancellation within the differential apparatus.

However, the arrangement in which the hub and the pinion carrier are integrated with each other as is in the prior art has the following disadvantages. That is, the pinion carrier is fixed to the axle so that the differential limiting function is made inoperative. Further, if the thrust of the axle is not stopped, the thrust force is inputted to the main clutch and the cam. An inconvenient differential limiting force is generated due to the thrust force applied to the main clutch. Thus, accurate control of the differential limiting force is affected by the thrust force applied to the cam.

SUMMARY OF THE INVENTION

It is an object of the invention to provide a differential apparatus which is capable of receiving a thrust force of an axle by a differential case without an influence on differential limiting function.

According to the invention, there is provided a differential apparatus for controlling differential between left- and right-hand axles of a vehicle, the differential apparatus comprising:

a differential mechanism including a ring gear, a plurality of first planetary gears in mesh with the ring gear, a plurality of second planetary gears in mesh with the first planetary gears respectively, a sun gear in mesh with the second planetary gears, and a carrier for rotatably supporting the first and second planetary gears;

a differential case rotatably supported by a vehicle body, the differential case receiving therein the differential mechanism and being provided with the ring gear of the differential mechanism;

a first hub provided rotatably within the differential case, the first hub being provided with the sun gear of the differential mechanism and being fixed to one of the axles;

a second hub provided rotatably within the differential case, the second hub being provided so as to be capable of being differential with respect to the first hub, the second hub being fixed to the other axle, the second hub being movable axially relative to the carrier and being integrally rotatable together with the carrier;

a first friction clutch for limiting differential between the carrier and the first hub;

a cam mechanism for generating an engaging force by which the first friction clutch is engaged, the cam mechanism cooperating with the carrier to engage the first friction clutch; and a second friction clutch for operating the cam mechanism.

With the arrangement of the invention, when the second friction clutch is engaged, a differential torque of the differential mechanism is applied to the cam mechanism. The first friction clutch is urged and engaged by the cam thrust force. Thus, differential is limited. At this time, the pinion carrier is a component of an operating system of the first friction clutch.

Both the left- and right-hand axles are fixed to the first and second hubs, respectively. The first and second hubs are rotatably supported by the differential case. Accordingly, the centrifugal force of the vehicle body and the thrust forces of the respective axles at turning are canceled out each other within the differential case.

In this case, since the pinion carrier is connected to the hubs in a manner allowing movement in an axial direction, the thrust force is not inputted to the cam and the clutch. Thus, the differential limiting function is not affected by the thrust force of the hubs fixed to axles.

DETAILED DESCRIPTION OF THE PREFERRED EMBODIMENTS

Figure 1:
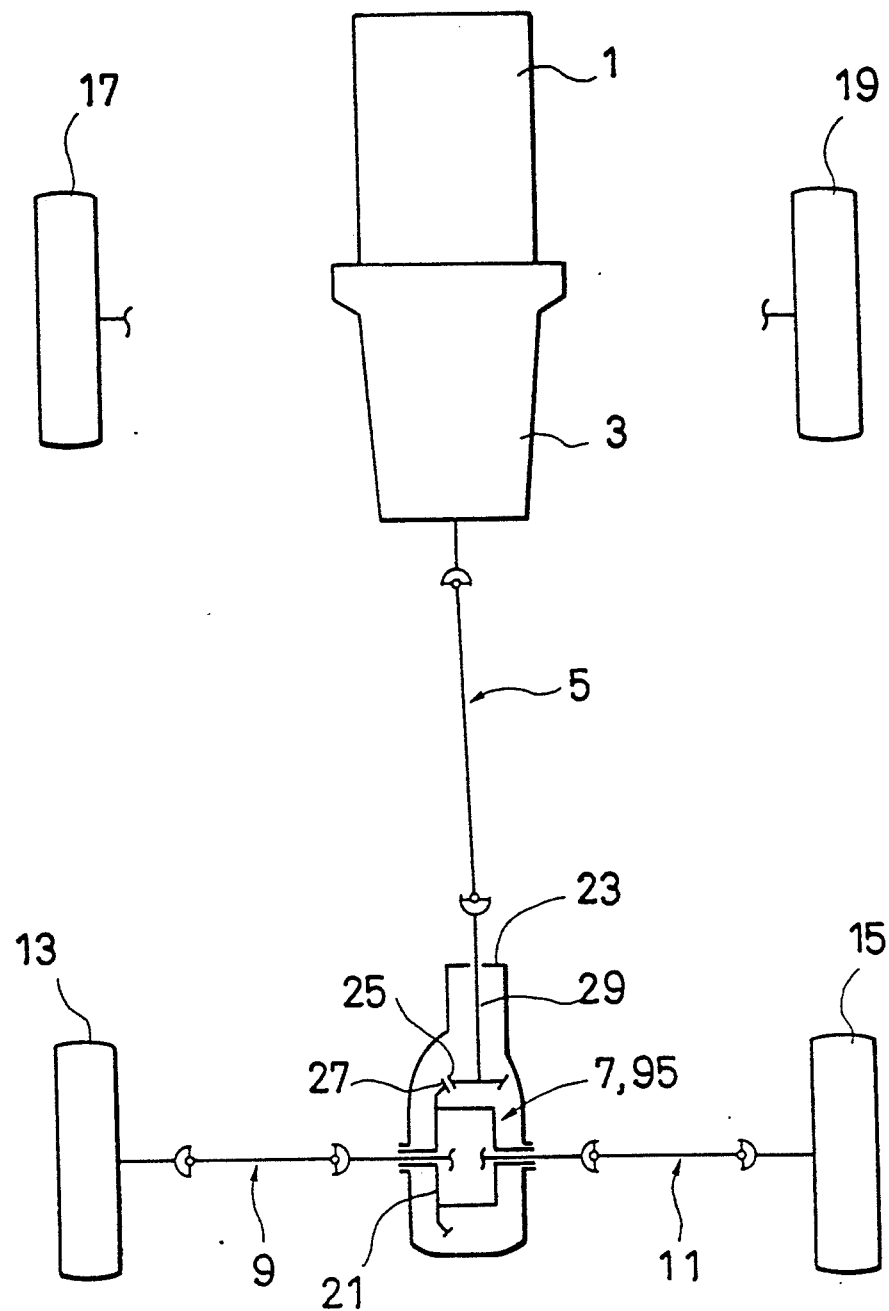
FIG. 1 is a skeleton mechanism view showing a power system of a vehicle on which each of embodiments of the invention is loaded.
Figure 2:
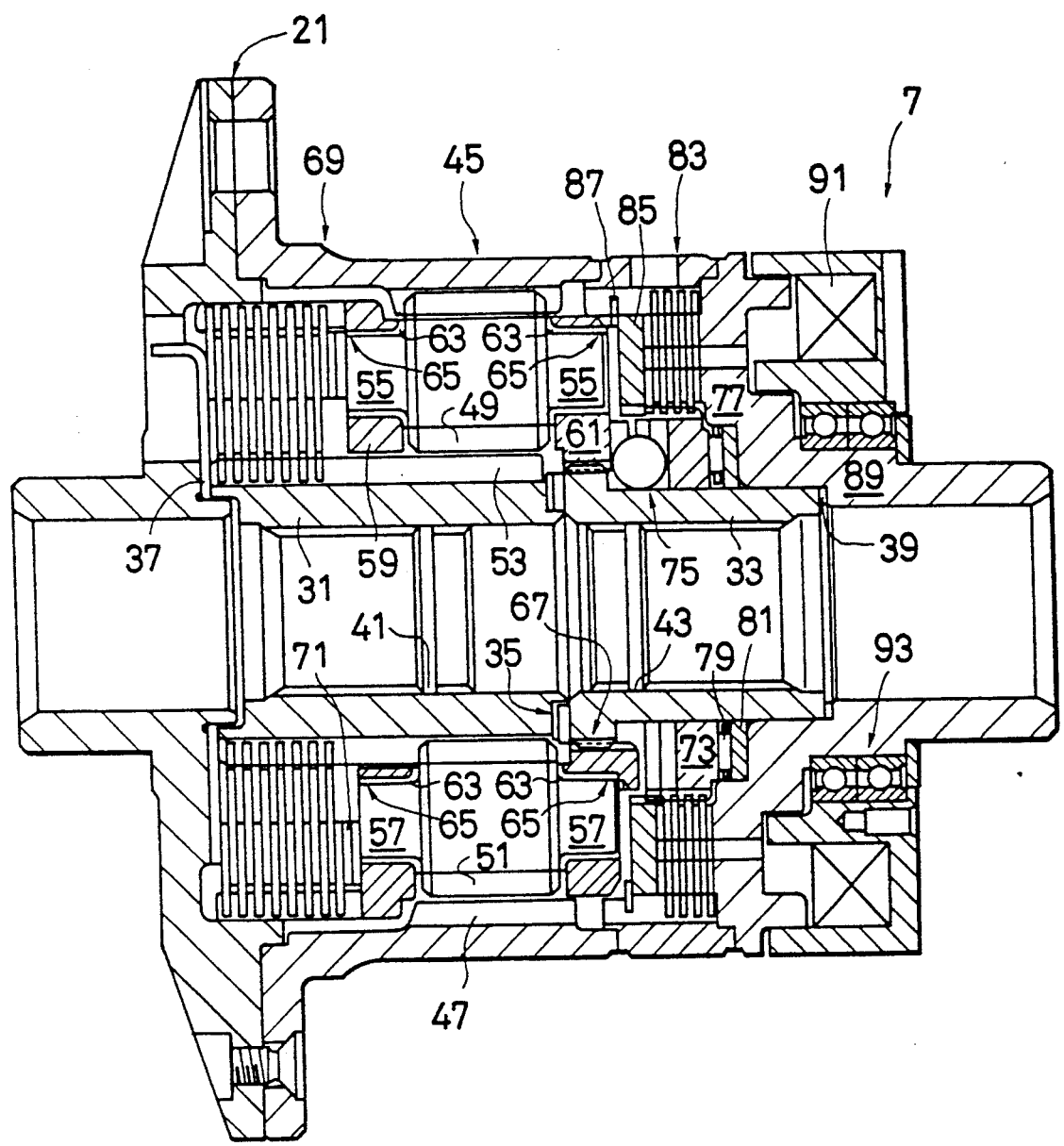
FIG. 2 is a cross-sectional view showing a differential apparatus according to a first embodiment of the invention.

Referring first to FIGS. 1 and 2, there is shown a first embodiment of the invention. FIG. 1 shows a power system of a vehicle which uses a differential apparatus according to the first embodiment of the invention, while FIG. 2 shows the differential apparatus according to the embodiment. A left- and right-hand direction is a left- and right-hand direction of the vehicle illustrated in FIG. 1. Parts and elements to which no reference numerals are applied are not shown.

As shown in FIG. 1, the power system comprises an engine 1, a transmission 3, a propeller shaft 5, a rear differential 7 (a differential apparatus in FIG. 2 arranged adjacent to rear wheels), a pair of rear axles 9 and 11, a pair of left- and right-hand rear wheels 13 and 15, a pair of left- and right-hand front wheels 17 and 19, and the like.

The rear differential gear 7 has a differential case 21 which is rotatably supported by a differential carrier 23. A ring gear 27 in mesh with a drive pinion gear 25 is fixed to the differential case 21. The drive pinion gear 25 is formed in integral relation to a drive pinion shaft 29 which is connected to the propeller shaft 5. Thus, a driving force of the engine 1 rotatively drives the differential case 21 through the transmission 3 and the propeller shaft 5.

As shown in FIG. 2, a pair of left- and right-hand hubs 31 and 33 are rotatively arranged within the differential case 21. A bearing 35 (positioning means) is arranged between the hubs 31 and 33. A pair of thrust washers 37 and 39 (positioning means) are arranged respectively between the differential case 21 and the hubs 31 and 33. Furthermore, the hubs 31 and 33 are connected through respectively to the left- and right-hand rear axles 9 and 11, and are positioned axially with respect to the rear axles 9 and 11 by snap rings which are mounted respectively in a pair of peripheral grooves 41 and 43.

Accordingly, when the vehicle is turned, a thrust force which is generated on the rear axles 9 and 11 rightwardly in FIG. 2, for example, is conducted to the hubs 31 and 33 and is inputted to the differential case 21 from the hubs 31 and 33 through the thrust washer 39 so that the thrust force is canceled out by a centrifugal force on the vehicle body. Moreover, a thrust force which is generated leftwardly in FIG. 2 is conducted to the hubs 31 and 33 and is inputted to the differential case 21 from the hubs 31 and 33 through the thrust washer 37, and is canceled out by the centrifugal force on the vehicle body.

A differential mechanism 45 of planetary gear type is arranged within the differential case 21. The differential mechanism 45 is provided with an internal gear 47, an outward pinion gear 49 and an inward pinion gear 51, and a sun gear 53. The internal gear 47 is formed on the differential case 21. The sun gear 53 is formed on the left-hand hub 31. The pinion gears 49 and 51 have respective shaft portions 55 and 57 thereof which are rotatively supported by left- and right-hand pinion carriers 59 and 61. A pair of slide bearings 65 having respective thrust washer portions 63 thereof are arranged between the pinion carriers 59 and 61 and the pinion gears 49 and 51, respectively. Further, the pinion carriers 59 and 61 are integrated with each other by welding. The right-hand pinion carrier 61 and the right-hand hub 33 are connected to each other through a spline portion 67 in a manner allowing movement only in the axial direction.

Rotation of the differential case 21 (internal gear 47) is distributed to the sun gear 53 (hub 31) and the pinion carriers 59 and 61 (hub 33) through the pinion gears 49 and 51, and is transmitted to the left- and right-hand rear wheels 13 and 15 through the respective rear axles 9 and 11. When a difference in driving resistance occurs between the rear wheels, the rotation of the differential case 21 is distributed to the left- and right-hand axles 9, 11 through rotation and revolution of the pinion gears 49 and 51.

A main clutch 69 (first friction clutch) of multiple disc type connecting the left-hand pinion carrier 59 and the hub 31 to each other is arranged to the left of the differential mechanism 45. A shim 71 is arranged between the main clutch 69 and the pinion carrier 59. Furthermore, a cam ring 73 is arranged on an outer periphery of the hub 33. A ball cam 75 is formed between the cam ring 73 and the pinion carrier 61. A bearing 79 and a washer 81 for receiving a cam reaction force are arranged between the cam ring 73 and a right-hand wall 77 of the differential case 21. A contact condition of the ball cam 75 to the cam ring 73 and the pinion carrier 61 is regulated by a thickness of the shim 71.

A pilot clutch 83 of multiple disc type (second friction clutch) is arranged between the cam ring 73 and the differential case 21. An armature 85 is arranged on the left of the pilot clutch 83. The armature 85 has an inner periphery which is connected to an outer periphery of the cam ring 73 in a manner allowing movement only in the axial direction. A snap ring 87 for positioning the armature 85 is mounted on the differential case 21.

A ring-like electromagnet 91 is arranged adjacent to the outer periphery of a right-hand boss 89 of the differential case 21. The electromagnet 91 is supported by the differential carrier 23, and is supported by the boss 89 through a bearing 93. When the electromagnet 91 is energized, the armature 85 is attracted so that the pilot clutch 83 is engaged. The cam ring 73 is connected to the side of the differential case 21 so that a differential torque is applied to the ball cam 75. The pinion carriers 59 and 61 are urged to the left by the cam thrust force. The main clutch 69 is connected between the pinion carrier 59 (shim 71) and the differential case 21 (thrust washer 37) and is engaged. Differential limitation of the differential mechanism 45 is executed by a connecting force of the clutches 69 and 83.

A magnetic force of the electromagnet 91 is controlled by manual operation from a driver's seat or automatic operation in accordance with a road surface's condition, a maneuvering condition and the like. Thus, when the engaging force (slide) of the pilot clutch 83 is adjusted, the cam thrust force changes due to a change in a differential torque applied to the ball cam 75 so that the engaging force (slide) of the main clutch 69 changes. Thus, the differential limiting force can be adjusted. When the engaging forces of the respective clutches 69 and 83 increase sufficiently, differential of the rear wheels 13 and 15 is locked. When the engaging force is adequately loosened, the differential is permitted. When the pilot clutch 83 is released, the cam thrust force disappears so that the main clutch 69 is also released, and differential is made free.

As described above, the pinion carrier 61 is movable axially with respect to the hub 33. Accordingly, the differential limiting function is not affected by the thrust force of the rear axles 9 and 11.

The rear differential 7 is arranged in a manner above-described.

In the vehicle shown in FIG. 1, even if one of the rear wheels 13 and 15 is brought to an idle-running condition in a bad road or a rough road or the like, a driving force is transmitted to the other rear wheel by the differential limiting force of the rear differential 7 so that a running ability is maintained. When the differential limiting force of the rear differential 7 is strengthened, stability of rectilinear propagation of the vehicle is improved. If the differential limiting force is loosened to adequately permit differential, the vehicle is turned smoothly and stably.

When the thrust force is applied to the rear axles 9 and 11 during turning of the vehicle, to the right in FIG. 2, for example, the thrust force is transmitted to the hubs 31 and 33, and is received by the differential case 21 through the thrust washer 39. In this case, the hub 33 is movable axially with respect to the pinion carrier 61 by the spline portion 67. Accordingly, the thrust force of the hub 33 is not transmitted to the pinion carrier 61. In other words, the thrust force of the hub 33 is not applied to or does not act on the ball cam 75 and the main clutch 69 through the pinion carrier 61. Accordingly, the ball cam 75 and the main clutch 69 can accurately and surely execute differential limitation of the rear differential gear 7 without influence of the thrust force of the rear axles 9 and 11. Thus, it is possible to secure maneuverability and safety.

Figure 3:
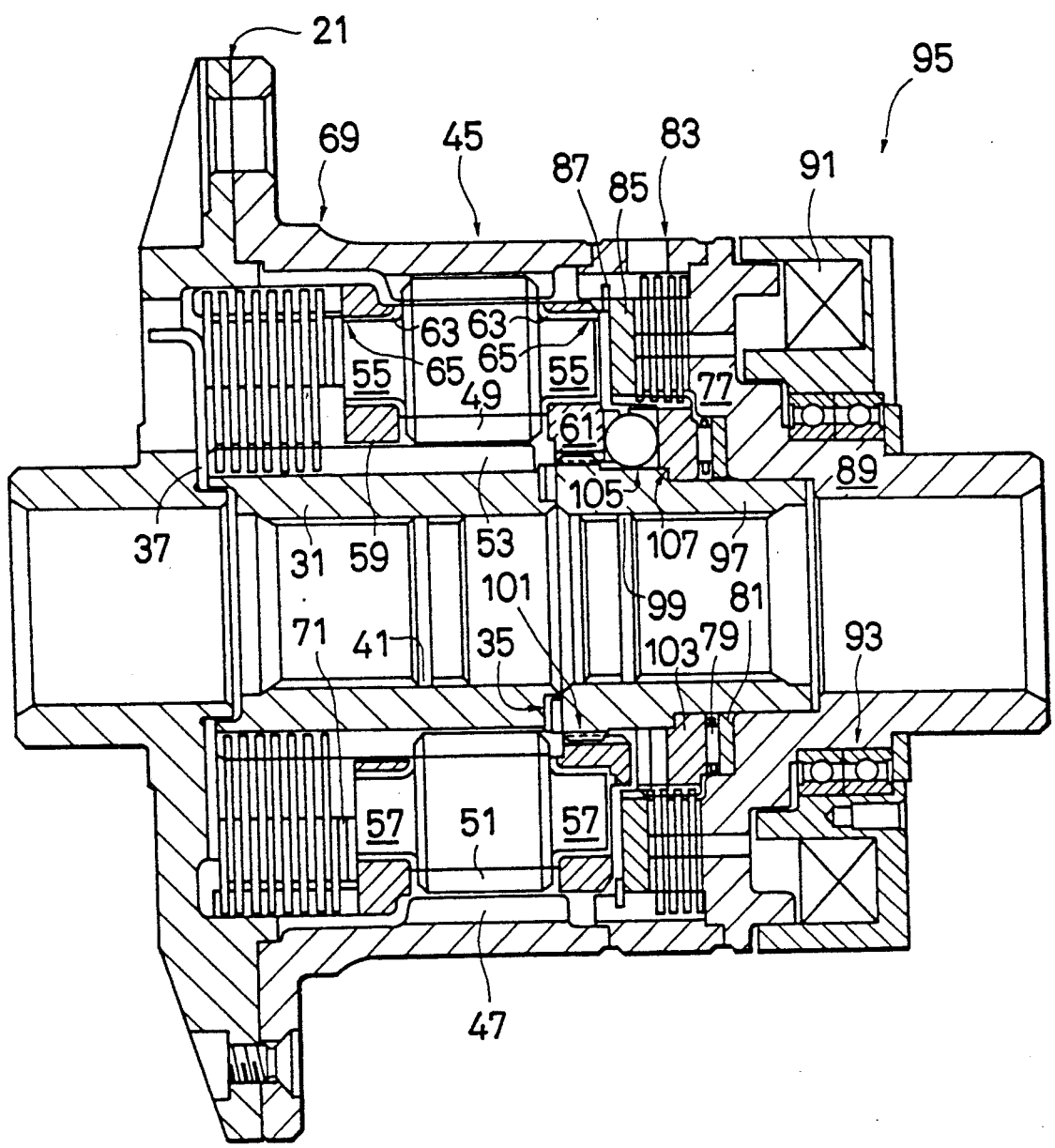
FIG. 3 is a cross-sectional view showing a second embodiment of the invention.

A second embodiment of the invention will next be described with reference to FIG. 3. The embodiment is a modification of the first embodiment, and is arranged on the vehicle illustrated in FIG. 1 as a rear differential 95. Only different points will hereunder be described. In this connection, a left- and right-hand direction is a left- and right-hand direction in FIG. 3. In FIG. 3, identical or same reference numerals are applied to components and parts having functions the same as those in FIG. 2. Furthermore, elements and parts to which no reference numerals are applied are not shown.

A right-hand hub 97 is connected to a right-hand rear axle 11 by a snap ring mounted in a peripheral groove 99 for axial immovability, and is connected to a right-hand pinion carrier 61 through a spline portion 101 in a manner allowing movement only in the axial direction. A cam ring 103 is arranged adjacent to an outer periphery of the hub 97. A ball cam 105 is formed between the cam ring 103 and the pinion carrier 61. Moreover, a pilot clutch 83 is arranged between the cam ring 103 and a differential case 21. An armature 85 is engaged with the cam ring 103 in a manner allowing movement only in the axial direction.

A stopper portion 107 (positioning means) receiving a right-hand thrust force applied to the hub 97 is formed between the hub 97 and the cam ring 103. Accordingly, during turning of the vehicle, the right-hand thrust force generated on the rear axles 9 and 11 is inputted to the differential case 21 from the stopper portion 107 through the cam ring 103, a bearing 79 (positioning means) and a washer 81 (positioning means), and is canceled out by the centrifugal force of the vehicle body. Thus, the thrust washer 39 in the first embodiment is unrequired. Further, since the pinion carrier 61 and the hub 97 are connected to each other for axial movement, the differential limiting function is not affected by the thrust forces of the respective axles 9 and 11.

In connection with the above, in the present invention, the second friction clutch, the first friction clutch and the differential mechanism may be arranged axially in this order, differentiated from the above-described embodiments. In this case, the pinion carrier serves as a pressure receiving element of the urging force of the first friction clutch.

What is claimed is:

1. A differential apparatus for controlling differential between left- and right-hand axles of a vehicle, said differential apparatus comprising:
   a differential mechanism including a ring gear, a plurality of first planetary gears in mesh with said ring gear, a plurality of second planetary gears in mesh with said first planetary gears respectively, a sun gear in mesh with said second planetary gears, and a carrier for rotatably supporting said first and second planetary gears;
   a differential case rotatably supported by a vehicle body, said differential case receiving therein said differential mechanism and being provided with said ring gear of said differential mechanism;
   a first hub provided rotatably within said differential case, said first hub being provided with said sun gear of said differential mechanism and being fixed to one of said axles;
   a second hub provided rotatably within said differential case, said second hub being rotatable relative to said first hub, said second hub being fixed to the other of said axles, said carrier being movable axially relative to said second hub and being integrally rotatable with said second hub;
   a first friction clutch for limiting differential between said carrier and said first hub;
   a cam mechanism for generating an engaging force by which said first friction clutch is engaged, said cam mechanism cooperating with said carrier to engage said first friction clutch; and
   a second friction clutch for operating said cam mechanism.

2. A differential apparatus according to claim 1, wherein a plurality of positioning elements for positioning said first and second hubs are arranged between said first and second hubs, said first hub and said differential case, and said second hub and said differential case, respectively.

3. A differential apparatus according to claim 1, wherein a bearing for receiving a thrust force is interposed between said first hub and said second hub.

4. A differential apparatus according to claim 1, wherein said second friction clutch includes an electromagnet clutch.

5. A differential apparatus for controlling differential between left- and right-hand axles of a vehicle, said differential apparatus comprising:
   a differential mechanism including a ring gear, a plurality of first planetary gears in mesh with said ring gear, a plurality of second planetary gears in mesh with said first planetary gears respectively, a sun gear in mesh with said second planetary gears, and a carrier for rotatably supporting said first and second planetary gears;
   a differential case rotatably supported by a vehicle body, said differential case receiving therein said differential mechanism and being provided with said ring gear of said differential mechanism;
   a first hub provided rotatably within said differential case, said first hub being provided with said sun gear of said differential mechanism and being fixed to one of said axles;
   a second hub provided rotatably within said differential case, said second hub being rotatable relative to said first hub, said second hub being fixed to the other of said axles, said carrier being movable axially relative to said second hub and being integrally rotatable with said second hub.
   a first friction clutch for limiting differential between said carrier and said first hub;
   a cam mechanism for generating an engaging force by which said first friction clutch is engaged, said cam mechanism cooperating with said carrier to engage said first friction clutch; and
   a second friction clutch for operating said cam mechanism, wherein said cam mechanism has a cam ring, and wherein said second hub is supported through positioning means such that an outward thrust force in an axial direction is received by said cam ring.

6. A differential apparatus according to claim 1, further including a spline portion, wherein said second hub engages said carrier through said spline portion.

* * * * *